United States Patent
Propst

[15] 3,685,558
[45] Aug. 22, 1972

[54] APPARATUS FOR FELLING AND BUNCHING TREES

[72] Inventor: Robert L. Propst, 2347 Londonderry Ave., Ann Arbor, Mich. 48104

[22] Filed: Nov. 18, 1970

[21] Appl. No.: 90,633

[52] U.S. Cl..............................144/3 D, 144/309 AC
[51] Int. Cl. ..............................................A01g 23/02
[58] Field of Search.............144/2 Z, 3 D, 34 R, 34 E, 309 AC

[56] References Cited

UNITED STATES PATENTS

| | | | |
|---|---|---|---|
| 3,269,436 | 8/1966 | Moore | 144/3 D |
| 3,348,592 | 10/1967 | Winblad et al. | 144/34 E |
| 3,487,864 | 1/1970 | Larson et al. | 144/34 R |

*Primary Examiner*—Gerald A. Dost
*Attorney*—Olsen & Stephenson

[57] ABSTRACT

Apparatus for harvesting trees consisting of a continuously moving vehicle having tree severing apparatus mounted on the forward end thereof and a pass-through clamp mechanism positionable above the severing apparatus for clamping and holding a felled tree. The clamp apparatus is movable upwardly and rearwardly to a position adjacent an upwardly and rearwardly extending standing rack mounted on the rear end of the vehicle and is operable, when adjacent the standing rack, to eject a tree held therein by passing it through the clamping mechanism so that it can fall into a bunch of trees stored on the standing rack. When a load of felled trees has been accumulated the standing rack can be lowered so as to discharge the bunch of trees accumulated thereon either in the field or at a selected deposit point.

4 Claims, 6 Drawing Figures

Patented Aug. 22, 1972

INVENTOR
ROBERT L. PROPST

BY

OLSEN & STEPHENSON
ATTORNEYS

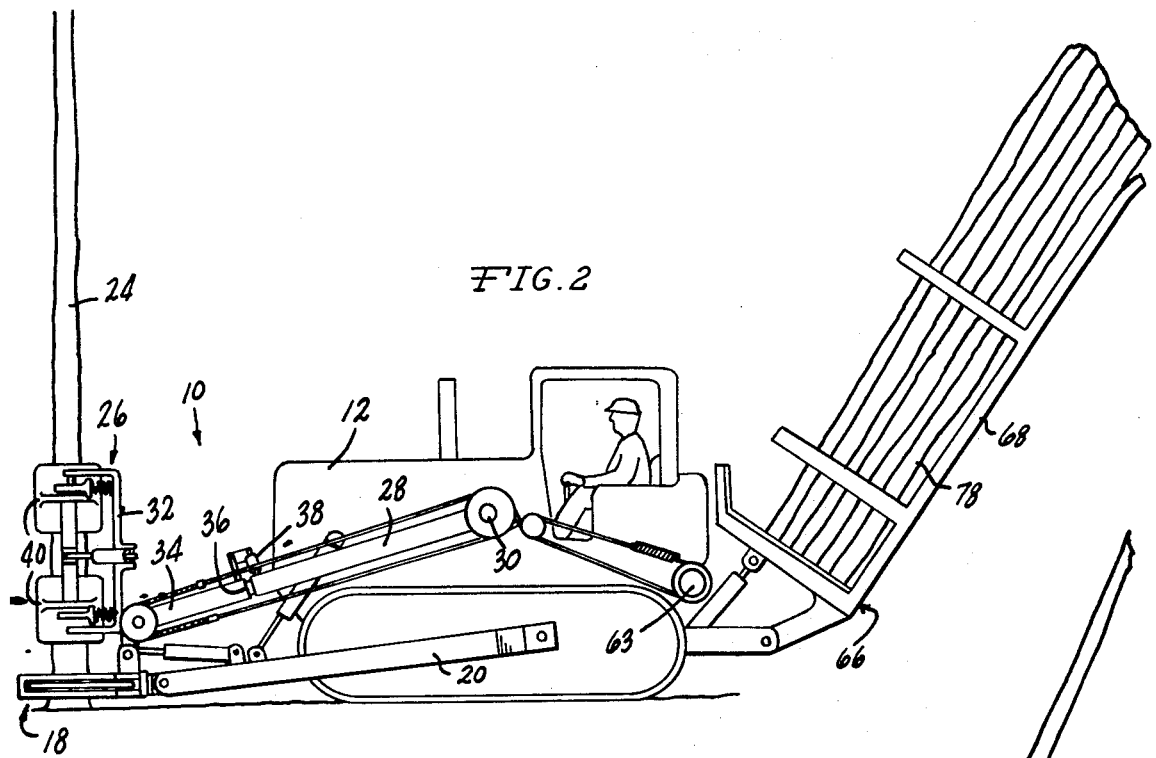
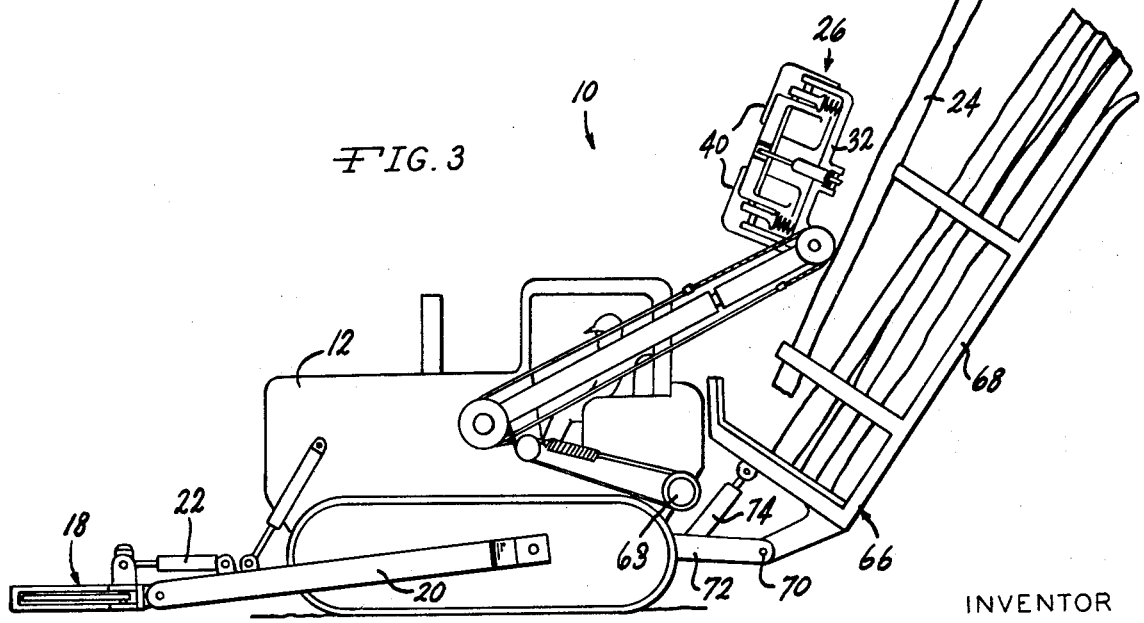
INVENTOR
ROBERT L. PROPST
BY
OLSEN & STEPHENSON
ATTORNEYS

INVENTOR
ROBERT L. PROPST
BY
OLSEN & STEPHENSON
ATTORNEYS

APPARATUS FOR FELLING AND BUNCHING TREES

This invention relates generally to the field of tree harvesting and more particularly to improved apparatus for severing trees of a wide variety of sizes and bunching the trees in a stored location on a vehicle.

There is a need in the tree harvesting industry for vehicle apparatus capable of quickly felling trees in a tree plantation and bunching the trees in a stored position on the vehicle. Accordingly, the principal object of this invention is to provide improved apparatus for felling and bunching trees.

The apparatus of this invention consists of a vehicle which is continuously movable in a forward direction and has tree severing apparatus mounted on the forward end thereof and a pass-through clamp mechanism movable between a tree gripping position disposed above the severing mechanism and a tree ejecting position disposed adjacent a standing tree storage rack mounted on the rear end of the vehicle. The pass-through clamp mechanism consists of jaws arranged in pairs and having opposed gripping faces. When the vehicle approaches a tree to be felled, the faces in each pair of jaws diverge in a forward direction for receiving the tree to be severed therebetween. The jaws are mounted on movable pivots and are actuated by hydraulic cylinder assemblies. As a result, the jaws can be moved apart to "tree hold" positions in which they clamp the severed tree between the gripping faces. The jaws are mounted on a supporting frame which is pivotally supported on the forward end of a pair of arms mounted on the vehicle. With a severed tree held in the clamp mechanism, the arms are swung upwardly and rearwardly concurrently with pivoting of the frame to finally locate the frame in an upwardly and rearwardly inclined position adjacent the standing rack. The hydraulic cylinder assemblies are then actuated to further rotate the jaws to positions in which the gripping faces diverge in a direction rearwardly of the vehicle to eject the tree from the clamping mechanism. The tree then falls onto a tree accumulator which ultimately functions to bunch a number of trees supported thereon. When the accumulator is full, the load can be discharged in the field or the vehicle can be moved to a tree deposit point at which the load is discharged. In the preferred embodiment of the invention, the accumulator is in the form of a standing rack which can readily be lowered to discharge trees accumulated thereon. Other forms of accumulators, such as horizontal racks which allow the trees to be skidded or dragged on the ground can be advantageously used, however, with the felling mechanism of this invention. The apparatus of this invention is thus operable to quickly harvest trees and deposit them in bunches at a desired location.

Further objects, features and advantages of this invention will become apparent from a consideration of the following description, the appended claims, and the accompanying drawing in which:

FIG. 2 is a side elevational view of the apparatus shown in FIG. 1 illustrating the apparatus in tree felling position;

FIG. 3 is a side elevational view of the apparatus shown in FIG. 1 illustrating the apparatus in position discharging a felled tree onto the standing rack;

Figure 1:
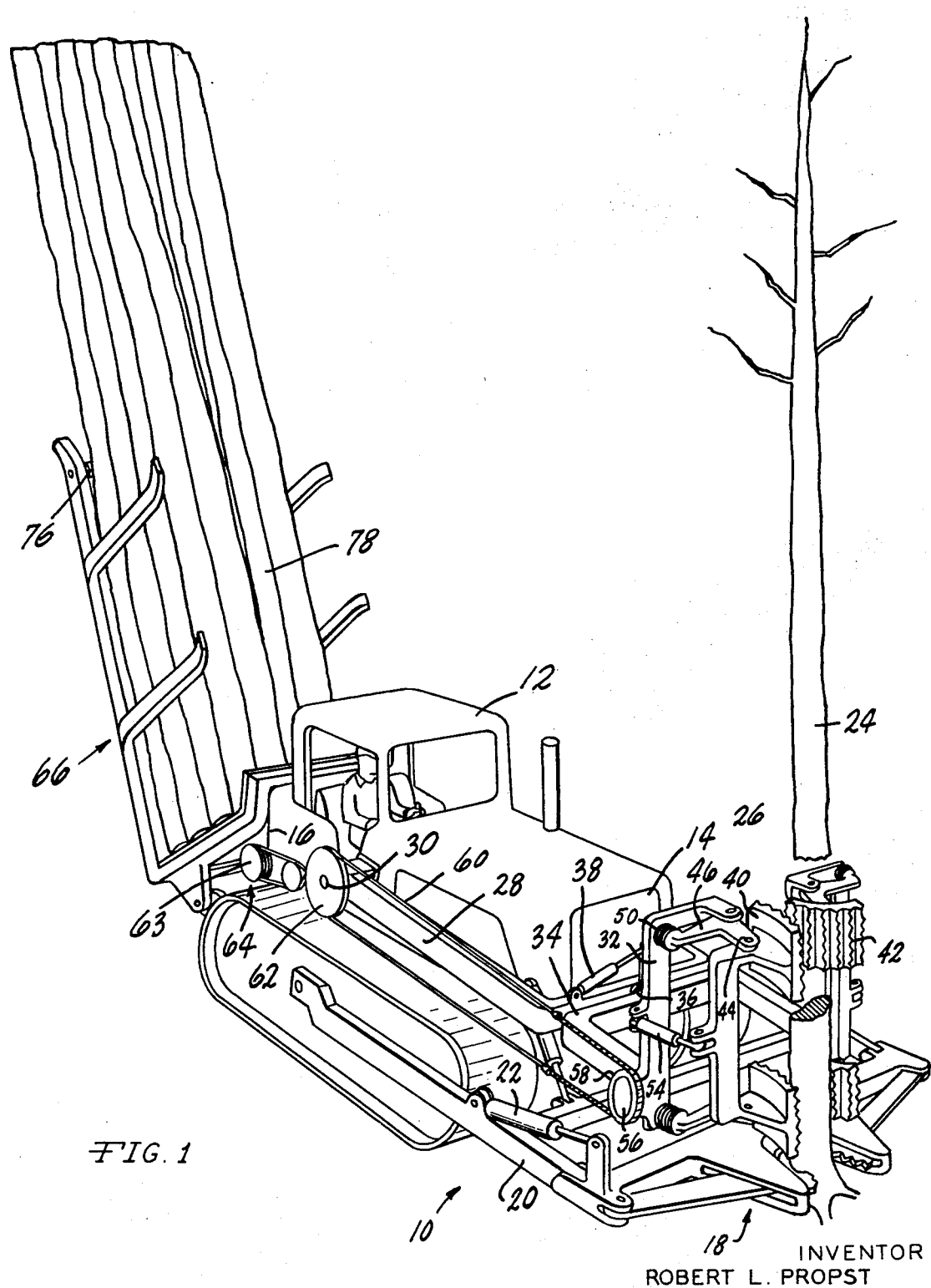
FIG. 1 is a perspective view of the tree felling and bunching apparatus of this invention shown in a position in which a tree is being felled.

With reference to the drawing, the apparatus of this invention, indicated generally at 10, is illustrated in FIG. 1 as consisting of a vehicle 12 having a front end 14 and a rear end 16. Tree severing apparatus 18, described in detail in my copending application, Ser. No. 29,109, filed Apr. 16, 1970, is pivotally mounted adjacent the vehicle front end 14 on the forward ends of arms 20 supported on the vehicle 12. Hydraulic cylinder assemblies 22 extend between the arms 20 and the apparatus 18 for positioning the apparatus 18 at the base of a tree 24 to be felled. A pass-through clamp mechanism, indicated generally at 26, is mounted on the forward end of a U-shape arm structure 28 which is pivotally mounted at its rear end on shafts 30 carried by the vehicle 12. The clamp mechanism 26 consists of an open frame 32 mounted on a support 34 which is in turn pivotally supported at 36 on the front end of the arm structure 28. A hydraulic cylinder assembly 38, which extends between the arm structure 28 and the support 34 is operable to move the frame 32 about a horizontal pivot so as to tip the frame 32 when necessary to align the clamp mechanism 26 with a tree 24 to be felled which is not disposed at precisely ninety degrees relative to the ground.

Figure 4:
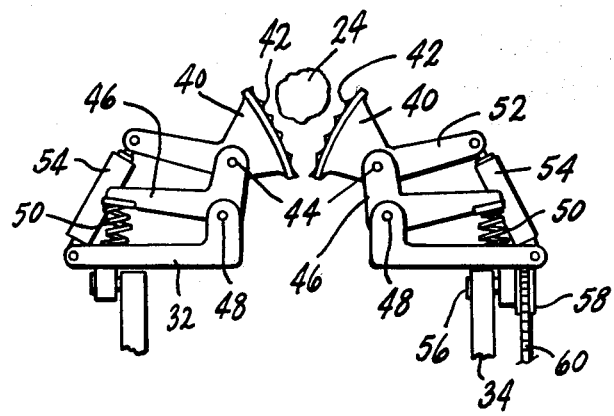
FIG. 4 is a fragmentary top view of the pass-through clamp mechanism of this invention in position preparatory to gripping a tree to be felled.
Figure 5:
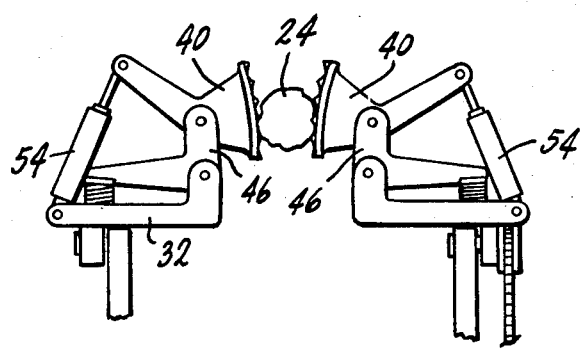
FIG. 5 is a fragmentary top view of the clamp mechanism in the apparatus of this invention, illustrated similarly to FIG. 4, showing the mechanism in "tree hold" position.
Figure 6:
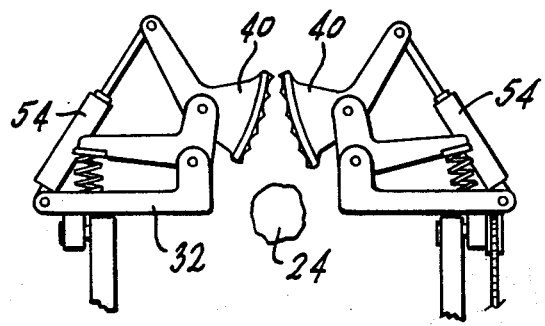
FIG. 6 is a fragmentary top view of the clamp mechanism shown in FIGS. 4 and 5 showing the mechanism in position ejecting a tree therefrom.

The pass-through clamp mechanism 26 consists of a plurality of jaws 40 arranged in horizontally aligned pairs with each jaw 40 having a toothed gripping face 42 and being pivotally mounted on a pin 44 carried by one end of a bellcrank member 46. Each bellcrank member 46 is in turn pivotally mounted intermediate its end on a pivot 48 carried by the frame 32. A compression spring 50 extends between the opposite end of each bellcrank member 46 and the frame 32 so as to continually urge the bellcrank member 46 in a direction to move the jaw 40 thereon toward the other jaw 40 in the pair, as shown in FIG. 4. The jaws 40 have extensions 52 which are pivotally connected to hydraulic cylinder assemblies 54 which, on extension, are operable to rotate the jaws 40 in each pair in relatively opposite directions as shown in FIGS. 4–6, inclusive.

The frame 32 is mounted on horizontal pivots 56 rotatably supported on the support 34 and provided with sprockets 58 on which chains and/or cables 60 are mounted. Each chain and/or cable 60 is trained about a pulley 62 on the shaft 30 and about the drive shaft 63 for a power drive mechanism 64 carried by the vehicle 12. On operation of the drive mechanism 64 to move the chains and/or cables 60, the arm structure 28 is movable upwardly and rearwardly from its downwardly and forwardly inclined position shown in FIG. 2 to its upwardly and rearwardly inclined position shown in FIG. 3 and concurrently therewith, the frame 32 is rotated in a counterclockwise direction on the pivots 56 so as to locate the frame 32 in a rearwardly and upwardly inclined position from which the trees can be discharged so that they fall on an accumulator or rack 66 that is mounted on the rear end 16 of the vehicle 12.

In the preferred form of the invention, the rack 66 consists of an open frame 68 which is inclined upwardly and rearwardly from the vehicle rear end 16 and is pivotally mounted at 70 on arms 72 carried by the vehicle 12. The upward inclination of the frame 68 results in the description of the rack 66 as a "standing rack". A hydraulic cylinder assembly 74 extends between the arms 72 and the frame 68 for moving the frame 68 between the upwardly and rearwardly inclined position shown in FIGS. 1 and 3, hereinafter referred to as the tree storage position, and a downwardly and rearwardly inclined discharge position. A plurality of rollers, one of which is shown at 76 in FIG. 1, form the floor of the frame 68 so that when the rack 66 is in its downwardly inclined position, a bunch 78 of trees thereon can roll off the frame 68.

In the operation of the apparatus 10, assume that a tree 24 is to be felled and moved to a supported position on the standing rack 66. The vehicle 12 is driven forwardly to the position shown in FIGS. 1 and 2 in which the tree 24 is engaged at its base by the severing apparatus 18 which functions to separate the tree 24 from its base. Concurrently, the tree 24 is gripped between the jaw faces 42 by extending the cylinder assemblies 54 from the positions shown in FIG. 4 to the positions shown in FIG. 5 as the tree 24 is moved between the jaws 40. The bellcrank members 46 pivot against the pressure of the springs 50 enabling the jaws 40 to move apart to the positions shown in FIG. 5 to hold the tree 24 therebetween. In the tree hold positions of the jaws 40 shown in FIG. 5, the springs 50 and the cylinder assemblies 54 cooperate to firmly clamp the tree 24 in the clamp mechanism 36. The drive shaft 63 is then actuated to swing the arm structure 28 from its downwardly and forwardly inclined position shown in FIG. 2 to its upwardly and rearwardly inclined position shown in FIG. 3. This movement of the arm structure 28 takes place concurrently with pivotal movement of the clamp frame 32 relative to the pivots 56 to provide for movement of the clamp mechanism 26 from its tree receiving position above the severing apparatus 18 to a discharge position in which the frame 32 is inclined upwardly and rearwardly at a location adjacent to and above the standing rack 66.

The hydraulic cylinder assemblies 54 are then further extended from their positions shown in FIG. 5 to their positions shown in FIG. 6 to move the jaw gripping faces 42 to rearwardly diverging positions in which they eject the tree 24 so that it falls downwardly onto the rack 66. It can thus be seen that the clamp mechanism 26 functions during the above-described cycle to grip the severed tree 24 and move it through the clamp mechanism 26 onto the standing rack 66. This capability of the clamp mechanism 26 to pass a tree 24 therethrough enables the use of a relatively simple and inexpensive clamp mechanism 26 which will perform both the holding and transfer functions necessary to move the severed tree 24 from its original standing position to its loaded position on the standing rack 66. The drive shaft 63 is then operated to return the clamp mechanism 26 to its position shown in FIGS. 1 and 2 in which it is in position to receive another tree 24. During movement of the clamp mechanism 26 between the positions shown in FIGS. 2 and 3, the vehicle 12 can be driven toward the next tree 24 to be harvested where the above-described cycle is repeated.

When a bunch 78 of trees of the desired size has been accumulated on the standing rack 66, the cylinder assembly 74 is extended to move the standing rack frame 68 to a downwardly and rearwardly inclined position in which the vehicle 12 can be driven forwardly and the trees in the bunch 78 will roll off the rack 66 on the rollers 76 and be deposited at a desired location. When all the trees have been discharged from the rack 66, the cylinder assembly 74 is retracted to return the rack to its position shown in FIG. 1 and harvesting operation operations are continued.

What is claimed is:

1. Apparatus for felling and bunching trees comprising a forwardly movable vehicle, means on the forward end of said vehicle operable to sever a tree from its base, clamp means movably mounted on said vehicle and positionable above said severing means for gripping a severed tree, tree accumulator means on the rear end of said vehicle, means on said vehicle operable to move said clamp means upwardly and rearwardly from said position above said severing means to a position adjacent said accumulator means for transfering a severed tree thereto said clamp means comprising at least one pair of spaced apart facing jaw members, movable pivot means supporting said jaw members for movement toward and away from each other, actuator means for pivotally moving said jaw members, frame means supporting said jaw members, said frame means having a front side configured to provide an opening through which a tree to be clamped by said jaw members can pass, and said frame means having a rear side configured to provide an opening through which a tree clamped by said jaw members can be ejected from said clamp means and onto said accumulator means.

2. Apparatus according to claim 1 wherein said movable pivot means supporting said jaw members includes bellcrank members pivotally mounted intermediate the ends thereof on said frame means, one of said jaw members being pivotally mounted on each of said bellcrank members adjacent one end thereof, and spring means extending between said frame means and each bellcrank member operable to urge the jaw member thereon toward the other jaw member in said pair.

3. Apparatus according to claim 2 wherein said actuator means comprises fluid actuated cylinder means on said frame means connected to each of said jaw members and operable to pivotally move the jaw members in a pair toward and away from each other.

4. Apparatus according to claim 1 wherein said means operable to move said clamp means comprises an arm structure pivotally mounted on said vehicle, and further including frame means pivotally mounted at the forward end of said arm structure and arranged in a supporting relation with said clamp means and drive means operable to concurrently swing said arm structure upwardly and rearwardly from a forwardly extending position and pivot said frame means rearwardly in a concurrent plane of rotation so that said frame means is inclined upwardly and rearwardly in the position thereof adjacent said accumulator means, said accumulator means including a frame pivotally mounted on the rear end of said vehicle for movement to a tree receiving position extending upwardly and rearwardly from said vehicle.

* * * * *